Figure 14:

(No Model.) 2 Sheets—Sheet 1.
S. DARLING.
TRY SQUARE.
No. 366,652. Patented July 19, 1887.
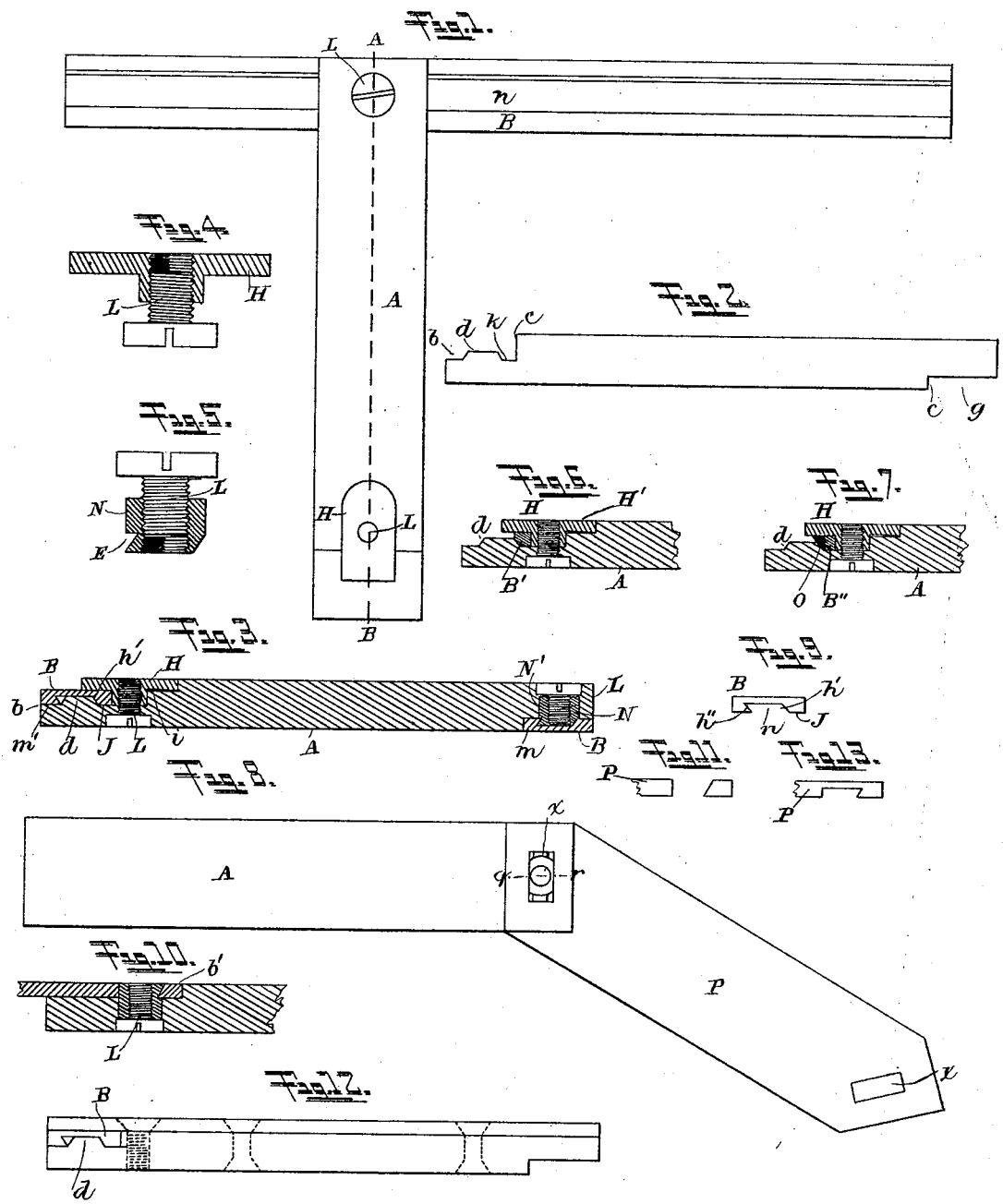
Witnesses
Will T. Norton
Wm. H. Bates
Inventor
Samuel Darling
By his Attorneys John J. Halsted & Son (No Model.)  2 Sheets—Sheet 2.

S. DARLING.
TRY SQUARE.

No. 366,652. Patented July 19, 1887.

Witnesses:
Chas. F. Schmelz.
Joseph J. Scholfield

Inventor
Samuel Darling
By S. Scholfield
Attorney.

UNITED STATES PATENT OFFICE.

SAMUEL DARLING, OF PROVIDENCE, RHODE ISLAND.

TRY-SQUARE.

SPECIFICATION forming part of Letters Patent No. 366,652, dated July 19, 1887.

Application filed July 19, 1886. Serial No. 208,434. (No model.)

*To all whom it may concern:*

Be it known that I, SAMUEL DARLING, of Providence, in the county of Providence and State of Rhode Island, have invented certain new and useful Improvements in Try-Squares; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The object of my invention is to produce an instrument that may be used as a try-square for testing internal and external angles of ninety degrees, as a bevel for the principal angles in common use, in which instrument blades of various widths and shapes may be used by removing one and substituting another, in which the blade may be adjusted to any length from the working face or faces of the stock required in the use of the instrument, in which the blade is held in a gain or rabbet at one end of the stock by a device that shall leave the side of the blade nearly flush and smooth with one side of the stock, and also having in the opposite end of the stock a deeper gain, in which the same blade may be securely held by suitable devices.

My improvement consists in making the stock or head with a rabbet or gain at one of its ends equal in depth to the thickness of the blade, leaving a shoulder at one side of the rabbet, the face of which is perpendicular to the bottom of the gain and square with the working-face of the stock, in making a beveled groove in one side of the blade, a nut having a beveled corner to fit the groove in the blade, and a screw-bolt for clamping the blade to the bottom of the gain and forcing its edge against the shoulder made by the gain; also, in making a gain or rabbet in the other end of the stock square with its working-face, leaving a raised rib beveled on one or both of its sides, the depth of this gain being about twice the thickness of the blade, bringing the latter nearly central in the stock, one side of the groove in the blade being made to fit approximately one side of the rib, and in using a nut-clamp in connection with this gain, instead of a beveled nut, which the screw fits the same as it does the latter, said screw co-operating with the bevels in the groove of the blade, and the rib forces the edge of the blade against the shoulder made by the gain or rabbet and holds it firmly and square with the face of the stock, and in making the sides of the beveled groove in the blade nearly parallel to each other, so that one side of it can be used with the rib in the deeper gain in one end of the stock and the other side with the bevel-nut in the gain at the other end of the stock.

Figure 15:
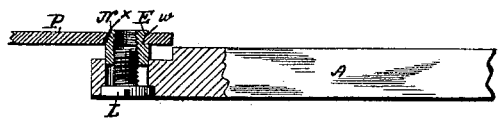

In the drawings, Figure 1 is a top side or plan view of my improved square; Fig. 2, an elevation of one edge or working-face of the stock; Fig. 3, an elevation of section through line A B, Fig. 1; Fig. 4, an enlarged sectional view of the clamp and screw applied to the deeper gain or rabbet in the stock; Fig. 5, an enlarged sectional view of the screw, with the beveled nut used in the rabbet in the stock, in which the blade is flush with the side of the stock; Figs. 6 and 7, vertical sections through the stock, through line A B, with different width of blades. Fig. 8 shows the stock of the square, having a blade made at an angle of sixty degrees at one of its ends and an angle of forty-five degrees at the other end; Fig. 9, a cross section of blade B; Fig. 10, a vertical section through line *q r*, Fig. 8. Fig. 11 is a vertical section of the blade through line *q r*, Fig. 8, separate from the stock. Fig. 12 is a longitudinal section of the stock, showing a modification. Fig. 13 represents a detail section of the beveled blade provided with a beveled groove, the section being taken at a point corresponding with the line *q r*, Fig. 8. Fig. 14 represents a detail section corresponding to that shown in Fig. 10, showing a modification. Fig. 15 also represents a detail section corresponding to that shown in Fig. 10, illustrating the position of the beveled nut for engagement with the beveled aperture in the blade.

Similar letters represent like parts in all the figures.

A is the stock or thicker part of the square; B, the blade or thinner part. In one end of the stock A is a gain or rabbet, *b*, with a shoulder, *c*, the latter being at a right angle with the face edges of the stock, and a rib, *d*, on the bottom of the gain parallel with the shoulder *c* and square with the working-face of the stock. The blade B has a longitudinal beveled groove, $n$, in one of its sides, one side of this groove, $h'$, being made to match the rib $d$ and the other side of the groove, $h''$, made to fit the bevel E in the corner of the nut N, Figs. 3 and 5. The gain $b$ is made a tenth of an inch (more or less) deeper than the thickness of the blade, which leaves that thickness of stock to rest against the edge of a table or surface upon which the square is used for drawing lines, so that both sides of the square can be used. The gain $g$ in the opposite end of the stock is made just deep enough to bring the sides of the blade and stock flush with each other, which is a feature of great convenience for many purposes. The blade may be graduated, if desired.

The screw-clamp H is let into the stock flush with its side and the stock cut away a little under the clamp at $i$, that the clamp may bear near the back end. The back end, H', of the clamp H can be attached to the stock by a screw, pin, or rivet, or it may even extend the whole length of the stock and be made a part of it, as shown in Fig. 12. The screw L may pass through the clamp H and screw into the stock, if preferred.

The part J of the blade B from the bevel to the edge is made a trifle wider—say one thousandth of an inch, more or less—than the part $k$ of the gain from the rib $d$ to the shoulder $c$, and when the clamp H is drawn down upon the blade with the screw L, the edge of the blade is forced against the shoulder $c$ by the wedging action of the bevel on the rib $d$ and held firmly in position.

Should the bevel of the groove in the blade or on the rib ever wear, to bring the parts J and $k$ together, the part $k$ can be lowered and the top of the rib taken off by filing sufficiently to restore the relative sizes required for the performance of their functions. It being necessary for many purposes to have the blade flush with the side of the stock and for other purposes to have it nearly central in the stock, as shown at $m$ and $m'$, Fig. 3, neither the clamp H nor nut N can be used to good advantage for both ends of the stock, which renders it desirable to provide both a clamp and a nut. For producing the best results the nut N should have nearly one-quarter of an inch bearing at N', Fig. 3, which it cannot have when the blade is set nearly central in the stock without making the latter too thick and heavy.

It will be seen, Fig. 6, that a narrow blade, B', having a bevel on its edge can be used as well as a wider blade, which is very convenient for purposes where a wider blade cannot be used. A still narrower blade or bar can be used, as shown at B'', Fig. 7, by applying a short loose beveled piece, $o$, which will perform the office of the bevel on the blade; also, a narrower blade beveled on one edge can be held in the gain at the other end of the stock with the bevel E, as shown in Fig. 10, and a still narrower one can be held by using the short beveled piece $o$, the outer side or narrower part up, as shown in Fig. 14.

In attaching the beveled blade P to the stock the nut must be run out sufficiently to enter the aperture $x$ and receive the beveled edge $w$ into the bevel E, as shown in Fig. 15. Then by means of the screw L the blade can be brought into the gain in the stock and held firmly in position; but the beveled blade P may have a beveled groove, instead of aperture $x$, as shown in Fig. 13, and could be used in either end of the stock when the latter is thick enough to use nut N in the deep gain. Any machinist can make as great a variety of beveled blades as he may have occasion to use.

In my application, Serial No. 194,365, filed March 8, 1886, I have claimed "an adjustable try-square having a cut-away portion or recess and an adjustable blade, one edge of which is forced and held against the shoulder in the recess by means of a clamp and the wedging of opposite bevel surfaces," and also, "an adjustable try-square, having a blade-holding stock or carrier provided with a cut-away portion or recess having a groove with a beveled side and a blade provided with a longitudinal rib, adapted to fit the groove in the cut-away portion or recess, and means for clamping the rib of the blade in the said groove." I therefore omit such claims in this application.

What I claim, and wish to secure by Letters Patent, is—

1. An adjustable try-square having a stock with a gain or rabbet in one end and an adjustable blade provided with a longitudinal groove, one side of the groove and the bottom forming an acute angle, a screw-nut having a bevel to fit the beveled side of the groove in the blade, and a screw adapted to force the edge of the blade by the action of the beveled surfaces of the groove and nut against the shoulder in the gain to hold the blade firmly in position.

2. An adjustable try-square having two gains or rabbets in its stock, one at each end, one gain being made deeper than the other, an adjustable blade adapted to fit in both gains, and means for securing the blade to the stock interchangeably in the gains.

3. An adjustable try-square having two gains or rabbets, one deeper than the other, an adjustable blade having a longitudinal groove in one of its sides, the sides of the groove being beveled in the same direction, so that one side and the bottom of the groove will form an obtuse angle, the other side and bottom forming an acute angle, and means for holding the blade interchangeably in the gains.

SAML. DARLING.

Witnesses:
PENNINGTON HALSTED,
CHARLES F. BUTTERWORTH.